United States Patent
Thacker et al.

(10) Patent No.: US 8,998,509 B2
(45) Date of Patent: Apr. 7, 2015

(54) STACKABLE PHOTONIC INTERCONNECT MODULE

(71) Applicant: Oracle International Corporation, Redwood City, CA (US)

(72) Inventors: Hiren D. Thacker, San Diego, CA (US); Xuezhe Zheng, San Diego, CA (US); Ashok V. Krishnamoorthy, San Diego, CA (US); Gary L. Gilbert, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 209 days.

(21) Appl. No.: 13/831,519

(22) Filed: Mar. 14, 2013

(65) Prior Publication Data

US 2014/0270784 A1   Sep. 18, 2014

(51) Int. Cl.
  *G02B 6/36* (2006.01)
  *G02B 6/42* (2006.01)
  *H04B 10/27* (2013.01)
  *G02B 6/43* (2006.01)

(52) U.S. Cl.
  CPC ............. *G02B 6/4284* (2013.01); *H04B 10/27* (2013.01); *G02B 6/4279* (2013.01); *G02B 6/43* (2013.01)

(58) Field of Classification Search
  CPC .......... G02B 6/43; G02B 6/4214; G02B 6/42; G02B 6/12
  USPC .................... 385/14, 15, 27, 53, 88
  See application file for complete search history.

(56) References Cited

U.S. PATENT DOCUMENTS 7,276,787 B2 * 10/2007 Edelstein et al. ............. 257/698
7,495,316 B2 *  2/2009 Kirby et al. .................. 257/621

* cited by examiner

*Primary Examiner* — Jennifer Doan
(74) *Attorney, Agent, or Firm* — Park, Vaughan, Fleming & Dowler LLP; Steven E. Stupp

(57) ABSTRACT

An interconnect module for communicating electrical signals and optical signals is described. In particular, an integrated circuit in the interconnect module receives and transmits the electrical signals with other components in a system that includes the interconnect module via an electrical connector. In addition, the integrated circuit receives and transmits electrical signals to a hybrid silicon-photonic bridge chip that performs electrical-to-optical and optical-to-electrical conversion. In turn, this bridge chip receives and transmits optical signals via an optical fiber. The interconnect module can be remateably connected to a backplane in the system, and can be arranged in a stacked configuration with other instances of the interconnect module. In these ways, the interconnect module facilitates dense, modular or scalable, and compact electrical and optical communication in the system.

20 Claims, 9 Drawing Sheets

STACKABLE PHOTONIC INTERCONNECT MODULE

BACKGROUND

1. Field

The present disclosure generally relates to the design of an interconnect module. More specifically, the present disclosure relates to the design of an interconnect module that includes a hybrid silicon photonic interconnect, and which facilitates assembling and integrating of multiple interconnect modules arranged into a stack.

2. Related Art

As total bandwidths from a VLSI chip approach 10 Tbps and beyond, the pin count and line speed of existing electrical input/output (I/O) interconnects often set physical limitations on the total data-communication capacity from existing packaging and printed-circuit-board technologies. As a consequence, optical communication is increasingly being used within systems to rapidly communicate large amounts of data. However, while conventional photonic technologies based on VCSELs can provide a convenient and cost-effective solution for transporting modest aggregate data capacity in certain parts of these systems (in particular, between racks and, in certain cases, between boards within a rack), VCSELs usually cannot be easily scaled to meet the extreme bandwidth, size, and power requirements needed for I/O interconnects that communicate directly to future chips (which are sometimes referred to as 'direct I/O interconnects').

Silicon photonics has been proposed as the technology of choice for direct I/O interconnects because, in principle, it can be integrated and scaled in production. However, the following need to occur before widespread acceptance of silicon photonics can be achieved. First, system designers need to have confidence that silicon photonics can meet the required reliability, manufacturing scale and cost points. Second, techniques for packaging and assembling of silicon-photonic transport mechanisms into a viable electrical-connector-based system need to be developed.

Hence, what is needed is an interconnect module that facilitates the use of silicon photonics in direct I/O interconnects without the problems described above.

SUMMARY

One embodiment of the present disclosure provides an interconnect module that includes: an electrical connector, at a first edge of the interconnect module, which receives and provides electrical signals; an optical fiber, at a second edge of the interconnect module, which receives and provides optical signals. Moreover, the interconnect module includes a bridge chip, having a first surface and coupled to the electrical connector and the optical fiber, which converts the electrical signals into the optical signals and the optical signals into the electrical signals. Furthermore, the interconnect module includes an integrated circuit, having a second surface facing the first surface, which transmits and receives the electrical signals. Additionally, the interconnect module may be capable of coupling to a backplane in conjunction with zero or more additional instances of the interconnect module in a stacked configuration.

In some embodiments, the integrated circuit serializes output electrical signals to the bridge chip and deserializes input electrical signals from the bridge chip. Alternatively, the interconnect module may include a second integrated circuit, coupled to the integrated circuit and the electrical connector, which serializes electrical signals to the integrated circuit and to deserializes electrical signals from the integrated circuit.

Note that the first edge may be on an opposite side of the interconnect module than the second edge. Alternatively, the first edge may be on a side of the interconnect module at a 90° angle from the second edge. This 90° angle may be in the plane of the interconnect module or perpendicular to the plane of the interconnect module. Therefore, the stacked configuration is at a 90° angle with respect to a plane of the backplane, or the interconnect module may couple to the backplane so that the interconnect module is parallel to a plane of the backplane.

Moreover, the optical fiber may be edge coupled to the bridge chip. Alternatively, the bridge chip may include grating couplers that surface-normal couple the optical signals to and from the optical fiber.

In some embodiments, the bridge chip includes: a semiconductor substrate; an oxide layer disposed on the semiconductor substrate; and a semiconductor layer disposed on the oxide layer. For example, the bridge chip may be implemented using silicon-on-insulator technology.

Another embodiment provides a system that includes: a processor, memory, the interconnect module, and the backplane.

Another embodiment provides a method for providing and receiving the electrical signals and the optical signals. During the method, the electrical signals are received and provided via the electrical connector at the first edge of the interconnect module. Moreover, the optical signals are received and provided via the optical fiber at the second edge of the interconnect module. Then, the electrical signals are converted into the optical signals and the optical signals are converted into the electrical signals using the bridge chip in the interconnect module, where the bridge chip has the first surface. Furthermore, the electrical signals are transmitted and received using the integrated circuit in the interconnect module, where the integrated circuit has the second surface facing the first surface. Next, the electrical signals are communicated to and from the electrical connector to the backplane, where the interconnect module is coupled to the backplane in conjunction with zero or more additional instances of the interconnect module in the stacked configuration.

Figure 1:
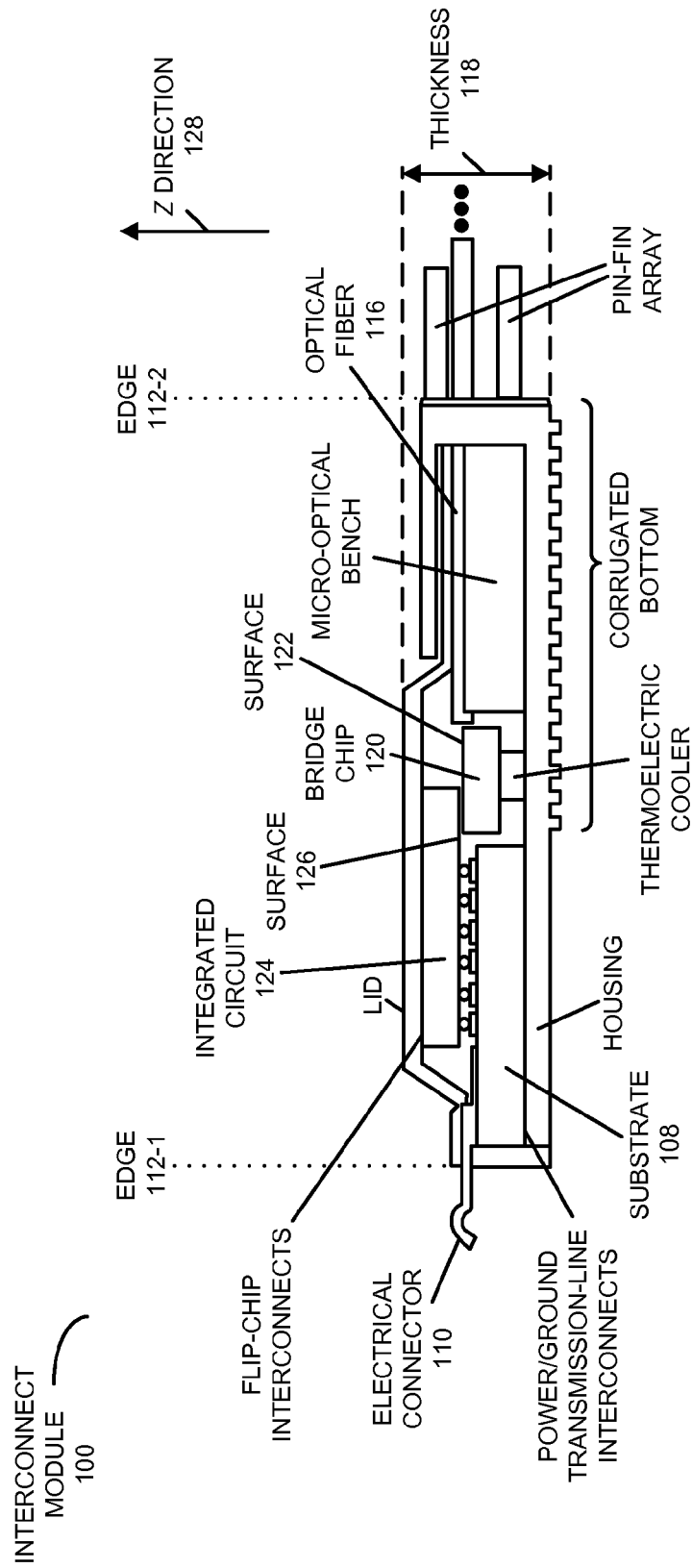
FIG. 1 is a block diagram illustrating a side view of an interconnect module in accordance with an embodiment of the present disclosure.

Table 1 summarizes different configurations of the interconnect module in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an interconnect module, a system that includes the interconnect module, and a method are described. This interconnect module communicates electrical signals and optical signals. In particular, an integrated circuit in the interconnect module receives and transmits the electrical signals with other components in the system via an electrical connector. In addition, the integrated circuit receives and transmits electrical signals to a hybrid silicon-photonic bridge chip that performs electrical-to-optical and optical-to-electrical conversion. In turn, this bridge chip receives and transmits optical signals via an optical fiber. The interconnect module can be remateably connected (for example, directly to a connector using blind-mate attachment or into vias) to a backplane (such as a circuit board) in the system, and can be arranged in a stacked configuration with other instances of the interconnect module.

In these ways, the interconnect module facilitates dense, modular or scalable, and compact electrical and optical communication in the system. For example, the use of silicon photonics offers low latency, low energy, and high bandwidth density. Moreover, several instances of the interconnect module may be used to achieve an ultrahigh linear input/output (I/O) bandwidth density of up to 100 Gbps/mm onto the backplane. The interconnect module can be used as a replacement for traditional electrical interconnects. In particular, on the transmit-side, the interconnect module can accept familiar high-speed electrical data, and can convert and output this electrical data as optical data on the optical fiber. Similarly, the interconnect module can accept received optical data and can output this optical data as electrical data that can be fed directly into the system. Therefore, the interconnect module can address the challenge of how to integrate optical communication into a viable electrical-connector-based system, and thus can provide direct I/O interconnects to chips in large-scale computing and switching systems.

We now describe embodiments of an interconnect module and a system that includes one or more instances of the interconnect module. FIG. 1 presents a block diagram illustrating a side view of an interconnect module 100. This interconnect module includes electrical connector 110, at an edge 112-1 of interconnect module 100, which receives and provides electrical signals and electrical power and ground for interconnect module 100. For example, electrical connector 110 may include an array of electrical leads or pins. These electrical leads may have the same form factor and design as counterpart components on a substrate 108 in interconnect module 100. Note that the electrical leads may be press-fit or solder-attached to substrate 108. This substrate 108 may include a material with low electrical losses (such as glass, plastic, an organic material, silicon and/or a ceramic material), and may include power/ground lines and high-speed transmission-line type interconnects to transfer signals from the electrical leads to an integrated circuit 124.

In addition, interconnect module 100 may include one or more optical fibers (such as optical fiber 116) or optical-fiber ribbons, at an edge 112-2 of interconnect module 100, which receives and provides optical signals. This optical fiber may be able to bend in the plane of interconnect module 100. As discussed further below with reference to FIG. 5, this may allow optical fiber 116 to be easily routed across a backplane (such as a circuit board) in a system, which may allow multiple instances of the interconnect module to be arranged in a stacked configuration.

Optical fiber 116 may be edge coupled to a bridge chip 120. Alternatively, bridge chip 120 may include grating couplers that surface-normal couple the optical signals to and from optical fiber 116. In some embodiments, optical fiber 116 is aligned with the couplers (edge or grating) on bridge chip 120 using a micro-optical bench. This micro-optical bench may be fabricated using micro-machined silicon so that optical fiber 116 can be aligned with submicron accuracy to on-chip components.

Interconnect module 100 facilitates integration of VLSI circuits (on integrated circuit 124) and photonic devices (on bridge chip 120) built on individually optimized platforms and, if needed, at different foundries. In particular, interconnect module 100 includes bridge chip 120 having a surface 122 and coupled to electrical connector 110 (via integrated circuit 124) and optical fiber 116. Bridge chip 120 may include arrays of devices that convert the electrical signals into the optical signals and the optical signals into the electrical signals, as well as optical modulators and optical detectors. In order to achieve much higher density and maintain compatibility with standard optical fiber formats, bridge chip 120 may also contain wavelength-division multiplexing components including: wavelength multiplexers, wavelength demultiplexers, optical waveguides, and polarization-splitting and combining elements. In an exemplary embodiment, bridge chip 120 includes: a semiconductor substrate; an oxide layer disposed on the semiconductor substrate; and a semiconductor layer disposed on the oxide layer. For example, bridge chip 120 may be implemented using silicon-on-insulator technology. Therefore, bridge chip 120 may include silicon photonics.

Furthermore, interconnect module 100 includes integrated circuit 124, having a surface 126 facing surface 122, which transmits and receives the electrical signals. (Note that integrated circuit 124 may provide power and ground to bridge chip 120.) This integrated circuit may be flip-chip attached to substrate 108 to reduce parasitics. As described further below, communication between integrated circuit 124 and bridge chip 120 may be facilitated by proximity communication, which can also provide ultralow parasitic chip-to-chip interconnects between these components.

In addition to transmitter and receiver circuits that interface with photonic devices, interconnect module 100 may also include signal-conditioning and retiming circuits to achieve aggregate bandwidths of 100 Gbps and beyond. Serializer-Deserializer (SerDes) circuits are typically used for this purpose. As summarized in Table 1, in different embodiments there may be different configurations of the interconnect module to provide this functionality. FIG. 1 illustrates configurations 1 and 2 in which there is a single integrated circuit that includes the SerDes circuits, i.e., integrated circuit 124 serializes output electrical signals to bridge chip 120 and deserializes input electrical signals from bridge chip 120. In this way, the optical I/O interface of interconnect module 100 may match the electrical I/O interface.

TABLE 1

|  | Bridge Chip 120 | Integrated Circuit 124 |
| --- | --- | --- |
| Configuration 1 | One VLSI chip (SerDes, electrical-to-optical circuits, optical-to-electrical circuits) | Silicon-photonic chip |
| Configuration 2 | One VLSI chip (SerDes) | Monolithic optoelectronic chip (photonic devices, electrical-to-optical circuits, optical-to-electrical circuits) |
| Configuration 3 | Two VLSI chips. Chip A: SerDes. Chip B: electrical-to-optical circuits and optical-to-electrical circuits. | Silicon-photonic chip |

Figure 2:
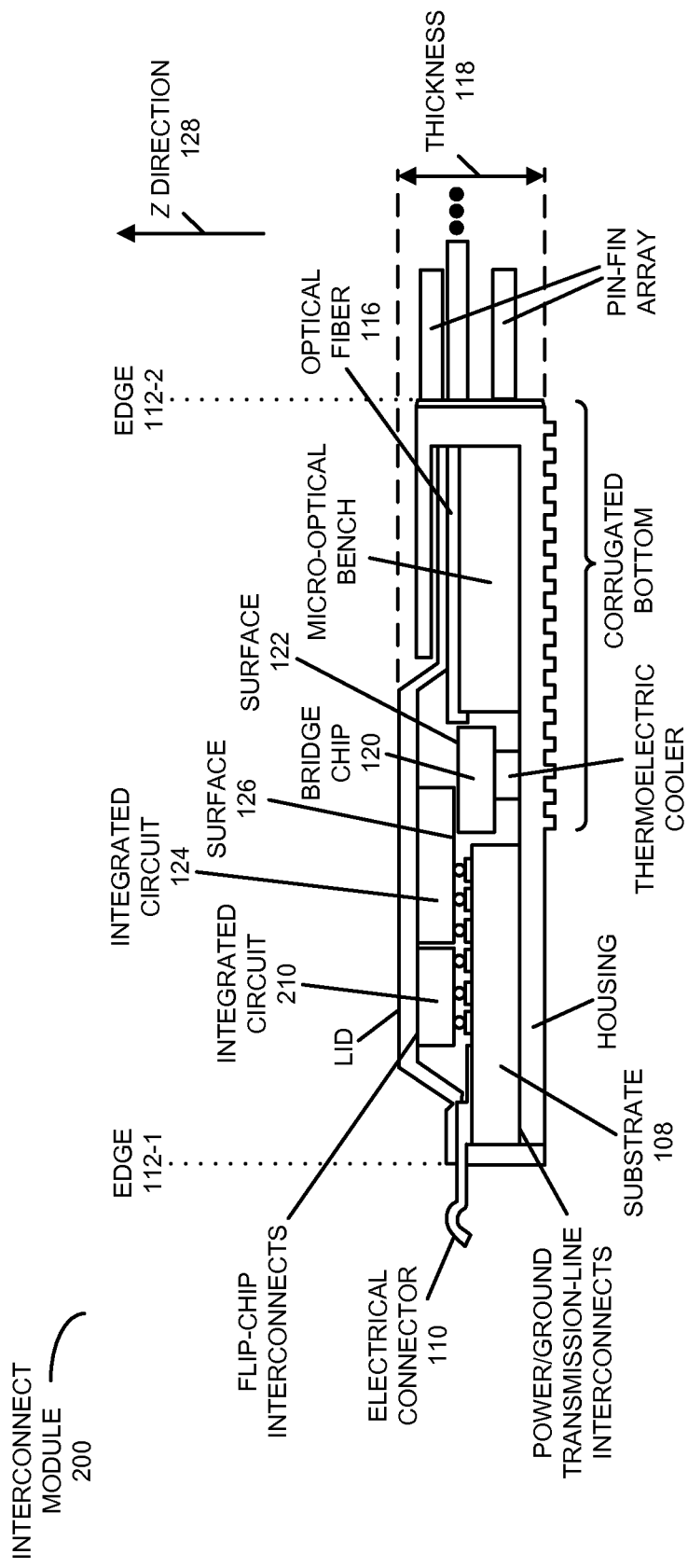
FIG. 2 is a block diagram illustrating a side view of an interconnect module in accordance with an embodiment of the present disclosure.

Configuration 2 is illustrated in FIG. 2, which presents a block diagram illustrating a side view of an interconnect module 200. In particular, interconnect module 200 includes integrated circuit 210 that serializes electrical signals to integrated circuit 124 and deserializes electrical signals from integrated circuit 124. Moreover, integrated circuit 124 includes electrical and optical transmit (or drive) and receive circuits.

Referring back to FIG. 1, in some embodiments the optical source(s) (such as lasers or optical diodes) that power optical modulators in interconnect module 100 may optionally be placed outside interconnect module 100 (for example, in a cooler and/or a more thermally controlled environment), and the optical signals may be brought in on the one or more optical fibers. (In some embodiments, redundant optical power may also be provided to interconnect module 100 using a space fiber or an optical waveguide on bridge chip 120.) This configuration may offer improved wavelength stability and control, and increased optical-source reliability. However, if space and operating temperature permit, in some embodiments the optical source(s) are packaged within interconnect module 100 close to bridge chip 120 or are hybrid bonded to bridge chip 120.

Bridge chip 120 and integrated circuit 124 may be separately and optionally heat-sunk and/or cooled. In particular, bridge chip 120 may be placed on an optional micro-thermoelectrical cooler to provide temperature and/or wavelength control. For example, the optional thermoelectrical cooler may be thermally coupled to a back surface (opposite to surface 122) of bridge chip 120. In addition, an optional integrated heat sink may remove heat along the direction of optical fiber 116, thereby allowing additional instances of the interconnect module to be stacked along z direction 128. In particular, edge 112-2 may include an array of pin fins that increase surface area and increase cooling efficiency in an air-cooled heat-sink configuration.

The components in the interconnect module may be housed in a mechanical housing constructed from injection-molded plastic and metal. High thermal conductivity metals such as aluminum and/or copper may be used to facilitate transport of heat generated during operation of the interconnect module. The bottom of the housing may contain a corrugated region to act as micro-pin fins to facilitate convection of heat. Furthermore, a metal lid may be attached to the housing on the top side to provide hermetic sealing and to provide an additional thermal pathway from the back surface of the integrated circuit(s) (opposite to surface 126) to the optional integrated heat sink. A thermal interface material may be used to achieve good thermal contact between the integrated circuit(s) and the metal lid. In addition, metal guides may thermally couple the metal lid to the pin fins on edge 112-2.

Figure 3:
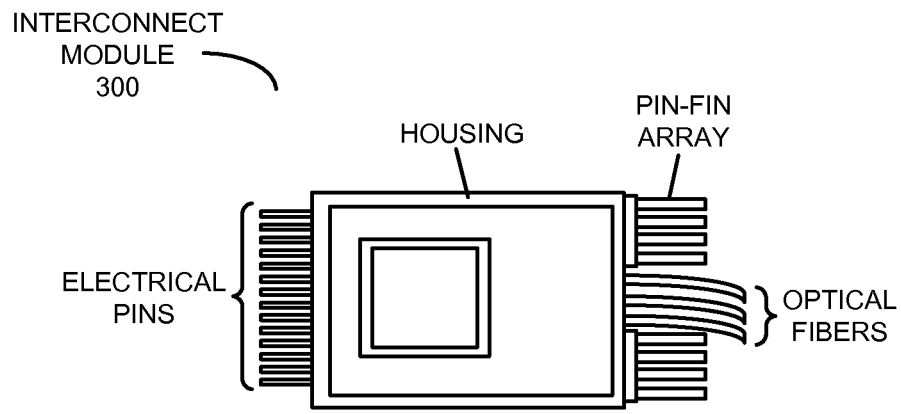
FIG. 3 is a block diagram illustrating a top view of the interconnect module of FIGS. 1 and 2 in accordance with an embodiment of the present disclosure.
Figure 4:
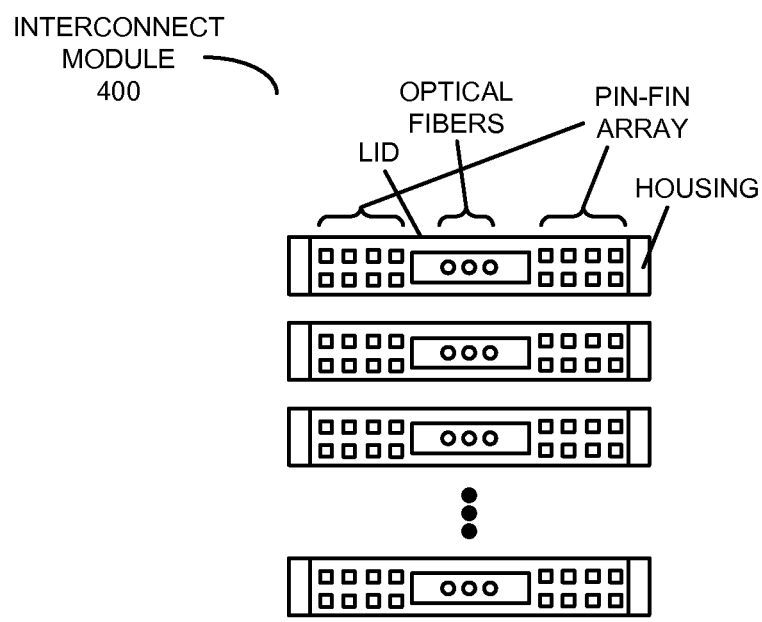
FIG. 4 is a block diagram illustrating a side view of the interconnect module of FIGS. 1 and 2 in accordance with an embodiment of the present disclosure.

FIG. 3 presents a block diagram illustrating a top view of interconnect module 300 (which may be either interconnect module 100 in FIG. 1 or interconnect module 200 in FIG. 2). Furthermore, FIG. 4 presents a block diagram illustrating a side view of interconnect module 400 (which may be either interconnect module 100 in FIG. 1 or interconnect module 200 in FIG. 2) along edge 112-2.

In an exemplary embodiment, the interconnect module is a multi-channel (e.g., four bidirectional channels) stackable unit with active optical cables or optical fibers that can be used as a backplane interconnect. For example, four instances of the interconnect module, which each have 25 Gbps data rates, can be used to provide a 100 Gbps data rate. The form factor of the interconnect module may include a thickness 118 (FIG. 1) less than or equal to 3 mm.

Figure 5:
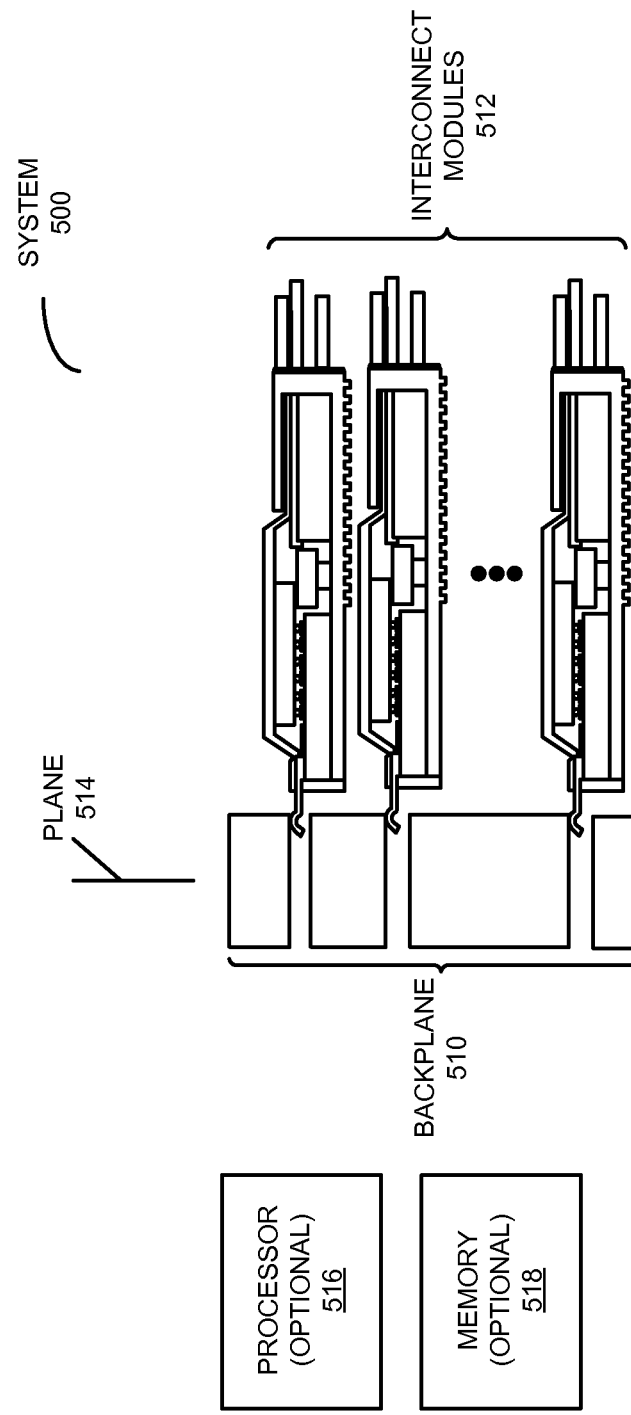
FIG. 5 is a block diagram illustrating a side view of a system that includes a backplane and one or more interconnect modules in accordance with an embodiment of the present disclosure.

As noted previously, the interconnect module may be capable of coupling to the backplane in conjunction with zero or more additional instances of interconnect module 100 in a stacked configuration. This is shown in FIG. 5, which presents a block diagram illustrating a side view of system 500 that includes: backplane 510, one or more interconnect modules 512 (such as interconnect module 100 of FIG. 1 or interconnect module 200 of FIG. 2), optional processor 516 and optional memory 518. Note that if edge 112-1 is on an opposite side of edge 112-2, the electrical pins in electrical connector 110 can be electrically coupled to a remateable connector on backplane 510.

Alternatively, interconnect modules 512 may be directly attached to backplane 510. For example, interconnect modules 512 may be directly plugged into vias on the circuit board or may be electrically coupled using solder. This is in contrast with existing optical modules because interconnect modules 512 are vertically stacked with the optical fibers or optical ribbons perpendicular to a plane 514 of backplane 510. Note that this configuration may also make it easier to route the optical fibers or optical ribbons.

Figure 6:
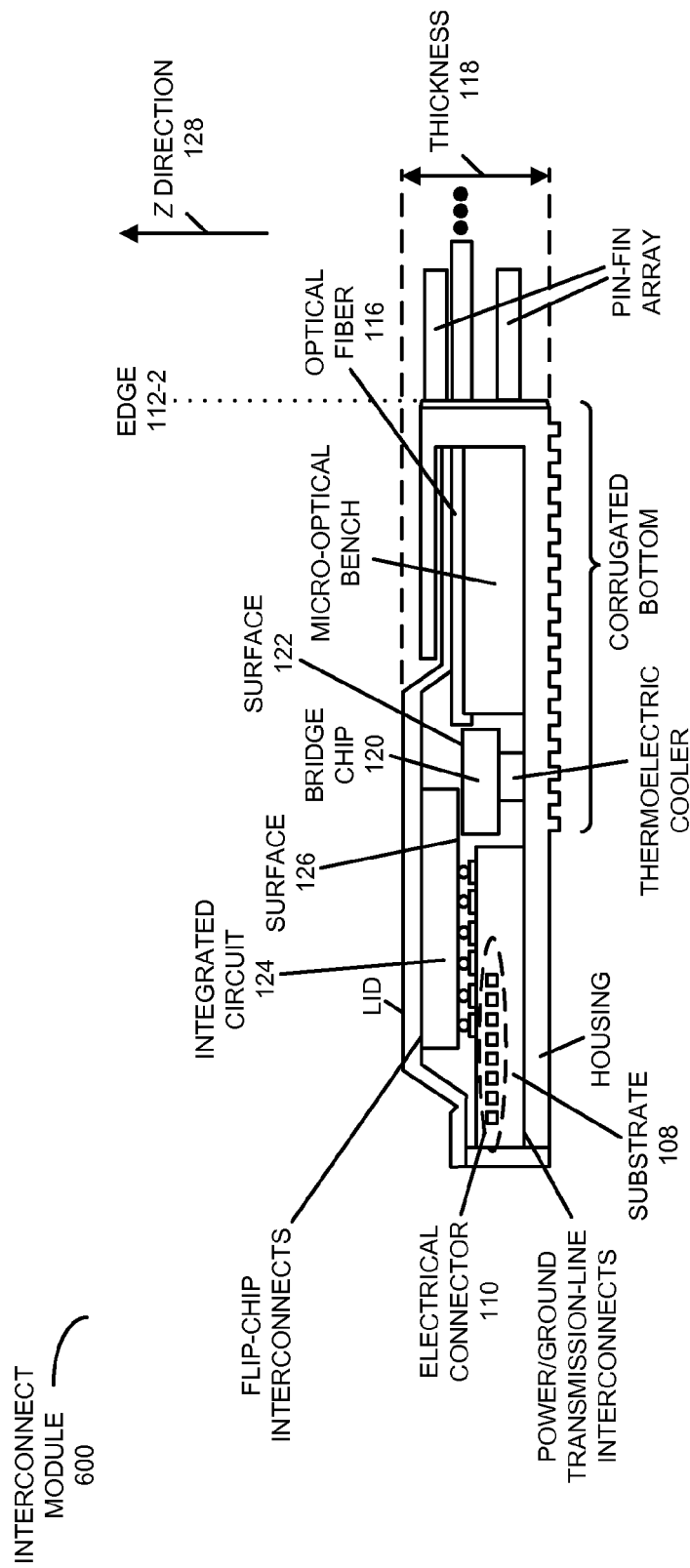
FIG. 6 is a block diagram illustrating a side view of an interconnect module in accordance with an embodiment of the present disclosure.
Figure 7:
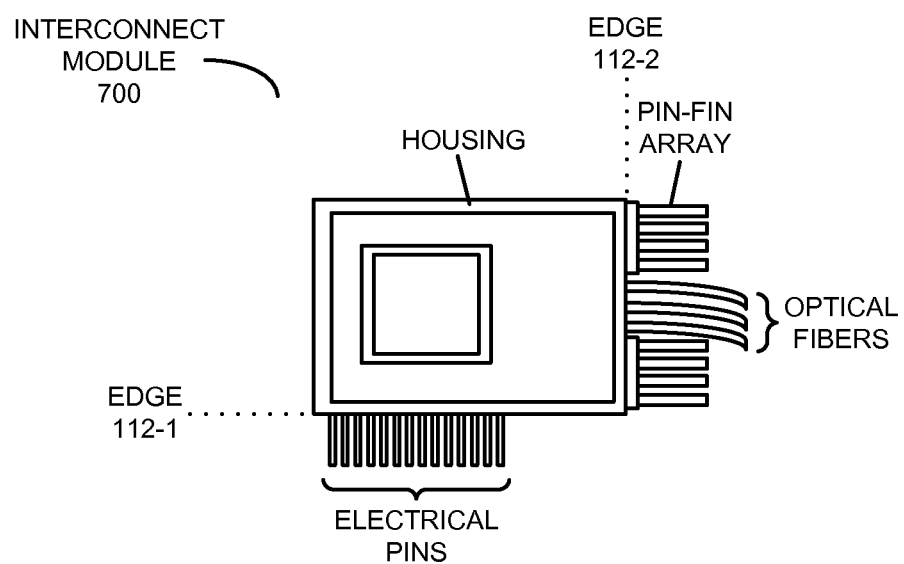
FIG. 7 is a block diagram illustrating a top view of the interconnect module of FIG. 6 in accordance with an embodiment of the present disclosure.
Figure 8:
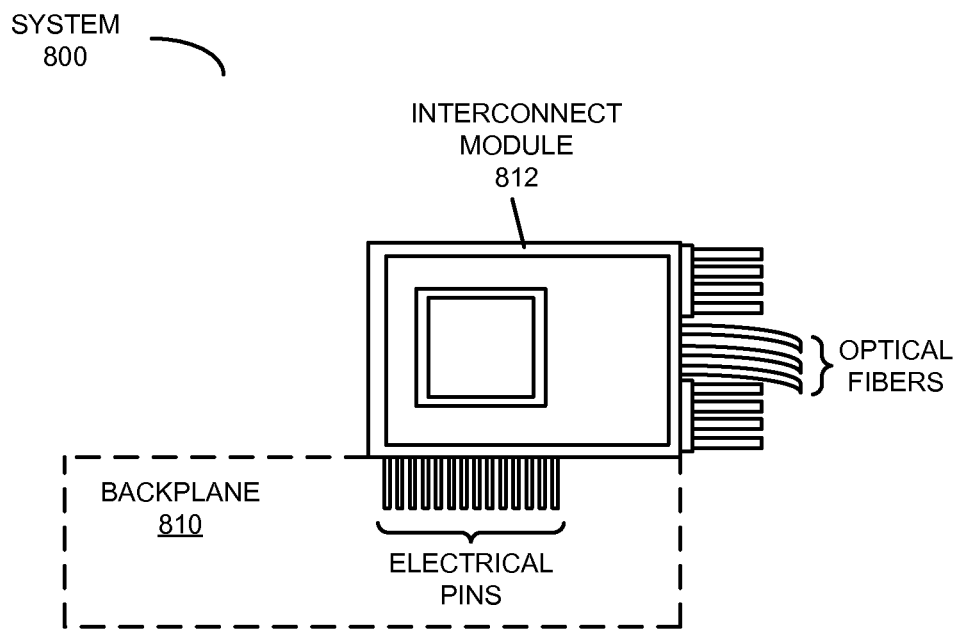
FIG. 8 is a block diagram illustrating a side view of a system that includes a backplane and one or more interconnect modules in accordance with an embodiment of the present disclosure.

In order to achieve this, the electrical leads in electrical connector 110 may be routed to one side of the interconnect module, i.e., edge 112-1 may be on a side of the interconnect module at a 90° angle from edge 112-2. This 90° angle may be in the plane of the interconnect module (or, as described below with reference to FIG. 9, perpendicular to the plane of the interconnect module). Therefore, the stacked configuration may be at a 90° angle with respect to plane 514 of backplane 510. This is shown in FIG. 6 (which presents a block diagram illustrating a side view of an interconnect module 600), FIG. 7 (which presents a block diagram illustrating a top view of an interconnect module 700) and FIG. 8 (which presents a block diagram illustrating a side view of system 800 that includes a backplane 810 and at least one interconnect module 812, such as interconnect module 600).

Figure 9:
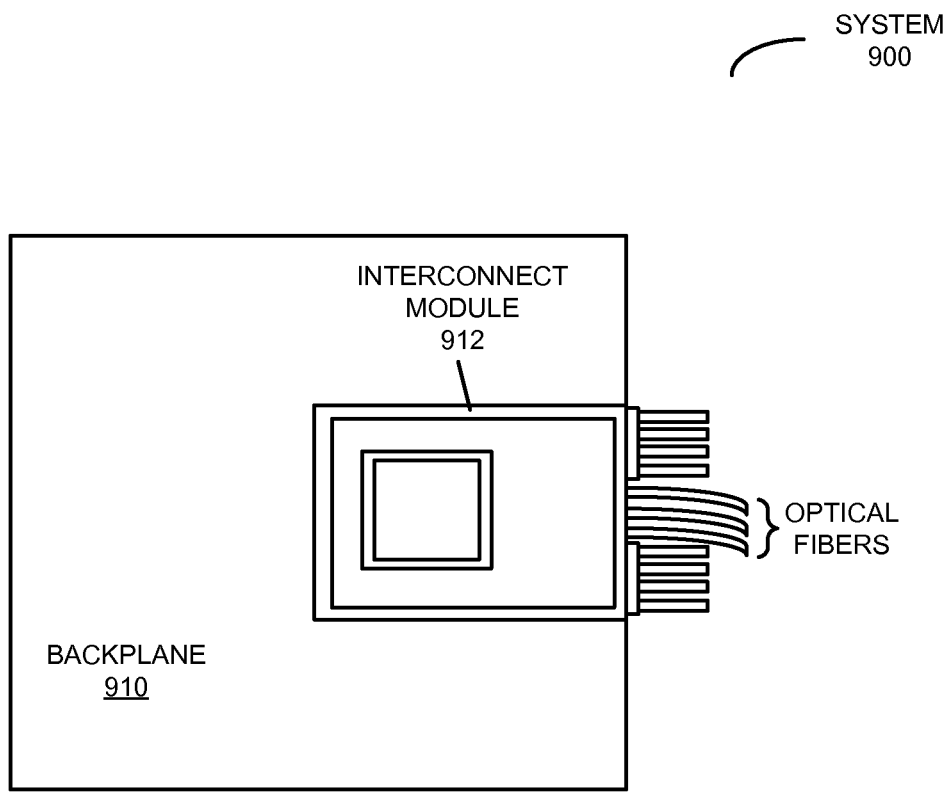
FIG. 9 is a block diagram illustrating a top view of a system that includes a backplane and an interconnect module in accordance with an embodiment of the present disclosure.

As noted previously, in some embodiments edge 112-1 is on a side of the interconnect module at a 90° angle from edge 112-2, and this 90° angle may be perpendicular to plane 514 (FIG. 5) of the interconnect module. Therefore, the interconnect module may couple to the backplane so that the interconnect module is parallel to plane 514 (FIG. 5) of the backplane. This is shown in FIG. 9, which presents a block diagram illustrating a top view of system 900 that includes a backplane 910 and an interconnect module 912. For example, interconnect module 912 may be electrically coupled to backplane 910 using ball-grid-array interconnects.

We now describe proximity communication between the bridge chip and the integrated circuit in the interconnect module. Referring back to FIG. 1, electrical and/or optical communication between bridge chip 120 and integrated circuit 124 may, in general, involve proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals. For example, bridge chip 120 and integrated circuit 124 may be electrically coupled by: solder (such as a reflowable solder layer), microsprings, wire bonds, and/or an anisotropic conducting film.

Therefore, the impedance associated with electrical contacts between bridge chip 120 and integrated circuit 124 may be conductive (i.e., in-phase) and/or capacitive (i.e., out-of-phase), such as when there is a passivation layer (e.g., a glass layer) above metal pads on or proximate to surfaces of bridge chip 120 and integrated circuit 124. In general, the impedance may be complex, which includes an in-phase component and an out-of-phase component. Regardless of the electrical contact mechanism, if the impedance associated with the contacts is conductive, conventional transmit and receive input/output (I/O) circuits may be used in components in the interconnect module. However, for contacts having a complex (and, possibly, variable) impedance, the transmit and receive I/O circuits may include one or more embodiments described in U.S. patent application Ser. No. 12/425,871, entitled "Receive Circuit for Connectors with Variable Complex Impedance," by Robert J. Drost et al., filed on Apr. 17, 2009, the contents of which are hereby incorporated herein by reference.

In order to increase the capacitance of the contacts between bridge chip 120 and integrated circuit 124, in some embodiments a conductive liquid, paste or film may be added to the contact area to fill in any gaps. Note that electrical coupling between bridge chip 120 and integrated circuit 124 may be removable or remateable (i.e., these components can be remateably coupled), which facilitates rework of interconnect module 100 during and/or after assembly and test. Note that remateable mechanical or electrical coupling should be understood to be mechanical or electrical coupling that can be established and broken repeatedly (i.e., two or more times) without requiring rework or heating (such as with solder). In some embodiments, the remateable mechanical or electrical coupling involves male and female components that are designed to couple to each other (such as components that snap together). Thus, remateable components are components that are configured to allow remateable coupling to be established.

However, in some embodiments the mechanical and/or the electrical coupling between bridge chip 120 and integrated circuit 124 is more permanent. For example, it may not be remateable, such as solder contacts.

In the case of an anisotropic film, the anisotropic properties of the anisotropic film enhance electrical conductivity normal to the surface of the anisotropic film while also diminishing electrical conductivity tangential to the surface of the anisotropic film. As a result, the anisotropic film electrically couples mechanically aligned pads on opposite faces of the anisotropic film. For example, the anisotropic film may include the PariPoser® material (from Paricon Technologies, Inc., of Fall River, Mass.), as well as a number of patented anisotropic films, including: U.S. Pat. No. 5,624,268, entitled "Electrical Conductors Using Anisotropic Conductive Films," and U.S. Pat. No. 4,778,950, entitled "Anisotropic Elastomeric Interconnecting System." In a PariPoser-type of anisotropic conductive elastomer film, small conductive balls are suspended in a silicone rubber such that the balls generally line up into columns and provide conduction normal, but not tangential, to the surfaces of the anisotropic film. As with the microsprings, in general the impedance of the resulting electrical contacts may be conductive and/or capacitive. If the impedance is conductive, conventional transmit and receive I/O circuits may be used in components in the interconnect module. However, if the impedance is complex, the transmit and receive I/O circuits in the interconnect module may include one or more embodiments described in U.S. patent application Ser. No. 12/425,871.

While the preceding embodiments illustrate particular configurations of the interconnect module and the system, a number of techniques and configurations may be used to implement: electrical contact, mechanical alignment, assembly, and/or electrical I/O between bridge chip 120 and integrated circuit 124. One alignment technique involves the use of etch pits in conjunction with balls in the etch pits to maintain relative alignment of bridge chip 120 and integrated circuit 124. The ball-and-etch-pit alignment technique can align surfaces 122 and 126 with mechanical tolerances of less than a micron under slight pressure that snaps the surfaces together.

More generally, any combination of mechanically coupling of compatible positive and negative surface features on surface 122 and 126 may align bridge chip 120 and integrated circuit 124 without or in combination with adhesives.

Note that in some embodiments electronic alignment techniques are used to correct for planar mechanical misalignments in interconnect module 100. For example, electronic alignment may be used with conductive and/or capacitive contacts if a given electrical pad on one surface contacts an array of transmit or receive electrical pads on a facing surface.

In general, functions of the interconnect module and the system may be implemented in hardware and/or in software. Thus, the system may include one or more program modules or sets of instructions stored in an optional memory or memory subsystem (such as DRAM or another type of volatile or non-volatile computer-readable memory), which may be executed by an optional processor or processing subsystem. Note that the one or more computer programs may constitute a computer-program mechanism. Furthermore, instructions in the various modules in the optional memory subsystem may be implemented in: a high-level procedural language, an object-oriented programming language, and/or in an assembly or machine language. The programming language may be compiled or interpreted, e.g., configurable or configured, to be executed by the processing subsystem.

Components in the system may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more:

application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, the system may be at one location or may be distributed over multiple, geographically dispersed locations.

Note that the system may include: a VLSI circuit, a switch, a hub, a bridge, a router, a communication system (such as a WDM communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable-computing device or a portable electronic device, a personal organizer, and/or another electronic device. Moreover, a given computer system may be at one location or may be distributed over multiple, geographically dispersed locations.

Furthermore, the embodiments of the interconnect module and/or the system may include fewer components or additional components. Although these embodiments are illustrated as having a number of discrete items, the interconnect module and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the interconnect module and/or the system may be implemented more in hardware and less in software, or less in hardware and more in software, as is known in the art.

Note that the interconnect module may be fabricated using an additive or positive process (i.e., a material-deposition process) and/or a subtractive or negative process (i.e., a material-removal process). For example, the process may include: sputtering, plating, isotropic etching, anisotropic etching, a photolithographic technique and/or a direct-write technique. Additionally, these processes may utilize a wide variety of materials, including: a semiconductor, metal, glass, sapphire, an organic material, a ceramic material, a plastic and/or silicon dioxide.

Figure 10:
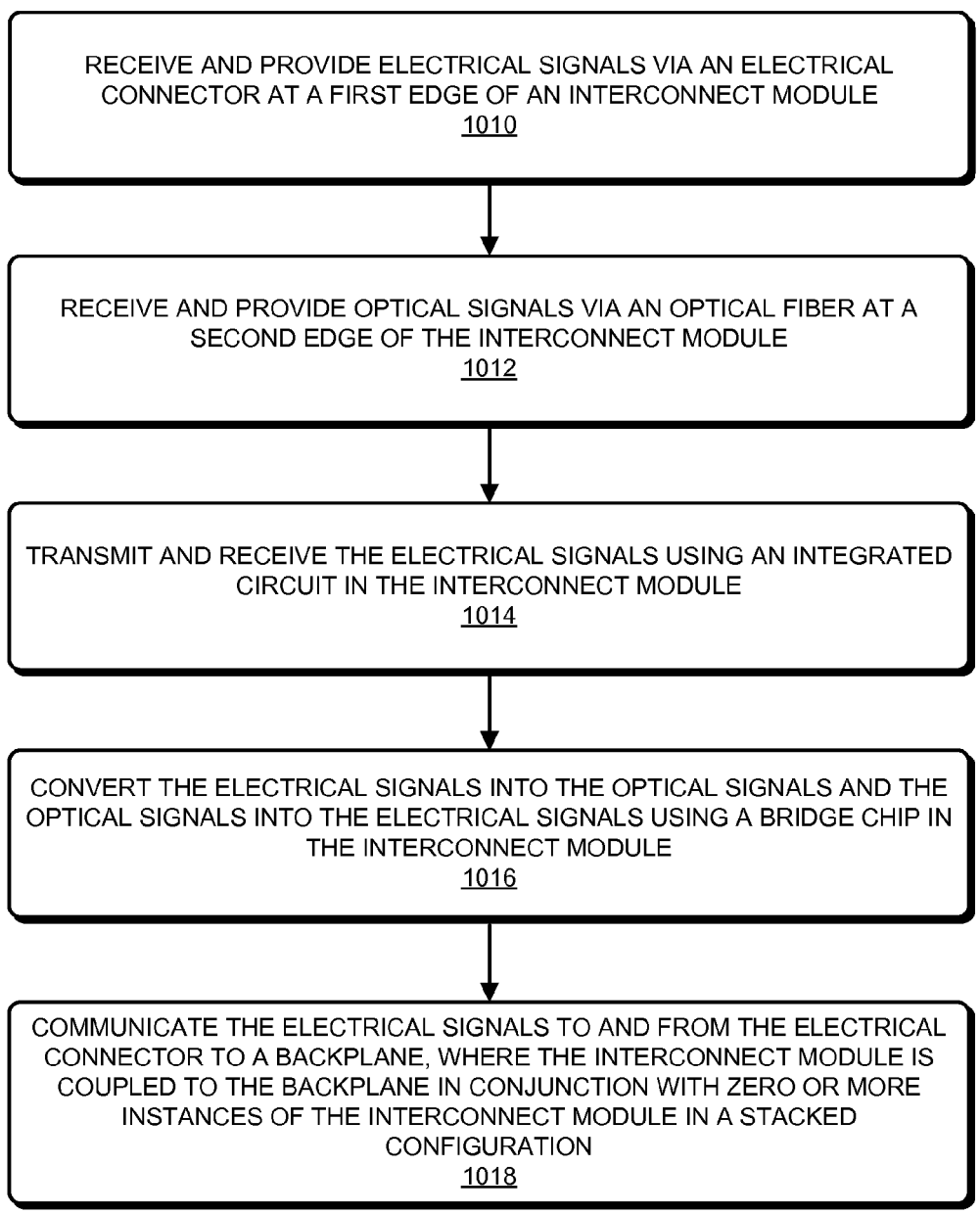
FIG. 10 is a flow chart illustrating a method for providing and receiving electrical signals and optical signals in accordance with an embodiment of the present disclosure.

We now describe embodiments of the method. FIG. 10 presents a flow chart illustrating a method 1000 for providing and receiving electrical signals and optical signals, which may be performed by one of the preceding embodiments of the interconnect module. During the method, electrical signals are received and provided via an electrical connector at a first edge of an interconnect module (operation 1010). Moreover, optical signals are received and provided via an optical fiber at a second edge of the interconnect module (operation 1012). Then, the electrical signals are transmitted and received using an integrated circuit in the interconnect module (operation 1014). Furthermore, the electrical signals are converted into the optical signals and the optical signals are converted into the electrical signals using a bridge chip in the interconnect module (operation 1016), where the bridge chip has a first surface, and where the integrated circuit has a second surface facing the first surface. Next, the electrical signals are communicated to and from the electrical connector to a backplane, where the interconnect module is coupled to the backplane in conjunction with zero or more additional instances of the interconnect module in a stacked configuration (operation 1018).

In some embodiments of method 1000 there are additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An interconnect module, comprising:
   an electrical connector, at a first edge of the interconnect module, configured to receive and to provide electrical signals;
   an optical fiber, at a second edge of the interconnect module, configured to receive and to provide optical signals;
   a bridge chip, having a first surface and coupled to the electrical connector and the optical fiber, configured to convert the electrical signals into the optical signals and the optical signals into the electrical signals; and
   an integrated circuit, having a second surface facing the first surface, configured to transmit and to receive the electrical signals, wherein the interconnect module is configured to couple to a backplane in conjunction with zero or more additional instances of the interconnect module in a stacked configuration.

2. The interconnect module of claim 1, wherein the integrated circuit is configured to serialize output electrical signals to the bridge chip and to deserialize input electrical signals from the bridge chip.

3. The interconnect module of claim 1, wherein the interconnect module further comprises a second integrated circuit, coupled to the integrated circuit and the electrical connector, configured to serialize electrical signals to the integrated circuit and to deserialize electrical signals from the integrated circuit.

4. The interconnect module of claim 1, wherein the first edge is on an opposite side of the interconnect module than the second edge.

5. The interconnect module of claim 1, wherein the first edge is on a side of the interconnect module at a 90° angle from the second edge.

6. The interconnect module of claim 5, wherein the stacked configuration is at a 90° angle with respect to a plane of the backplane.

7. The interconnect module of claim 5, wherein the interconnect module is configured to couple to the backplane so that the interconnect module is parallel to a plane of the backplane.

8. The interconnect module of claim 1, wherein the optical fiber is edge coupled to the bridge chip.

9. The interconnect module of claim 1, wherein the bridge chip includes grating couplers configured to surface-normal couple the optical signals to and from the optical fiber.

10. The interconnect module of claim 1, wherein the bridge chip includes:
    a semiconductor substrate;
    an oxide layer disposed on the semiconductor substrate; and
    a semiconductor layer disposed on the oxide layer.

11. A system, comprising:
    a processor;
    memory; and
    an interconnect module, wherein the interconnect module includes:
        an electrical connector, at a first edge of the interconnect module, configured to receive and to provide electrical signals;
        an optical fiber, at a second edge of the interconnect module, configured to receive and to provide optical signals;
        a bridge chip, having a first surface and coupled to the electrical connector and the optical fiber, configured to convert the electrical signals into the optical signals and the optical signals into the electrical signals; and
        an integrated circuit, having a second surface facing the first surface, configured to transmit and to receive the electrical signals; and
    a backplane coupled to the interconnect module in conjunction with zero or more additional instances of the interconnect module in a stacked configuration.

12. The system of claim 11, wherein the integrated circuit is configured to serialize output electrical signals to the bridge chip and to deserialize input electrical signals from the bridge chip.

13. The system of claim 11, wherein the interconnect module further comprises a second integrated circuit, coupled to the integrated circuit and the electrical connector, configured to serialize electrical signals to the integrated circuit and to deserialize electrical signals from the integrated circuit.

14. The system of claim 11, wherein the first edge is on an opposite side of the interconnect module than the second edge.

15. The system of claim 11, wherein the first edge is on a side of the interconnect module at a 90° angle from the second edge.

16. The system of claim 15, wherein the stacked configuration is at a 90° angle with respect to a plane of the backplane.

17. The system of claim 15, wherein the interconnect module is configured to couple to the backplane so that the interconnect module is parallel to a plane of the backplane.

18. The system of claim 11, wherein the optical fiber is edge coupled to the bridge chip.

19. The system of claim 11, wherein the bridge chip includes grating couplers configured to surface-normal couple the optical signals to and from the optical fiber.

20. A method for providing and receiving electrical signals and optical signals, wherein the method comprises:
    receiving and providing the electrical signals via an electrical connector at a first edge of an interconnect module;
    receiving and providing the optical signals via an optical fiber at a second edge of the interconnect module;
    converting the electrical signals into the optical signals and the optical signals into the electrical signals using a bridge chip in the interconnect module, wherein the bridge chip has a first surface;
    transmitting and receiving the electrical signals using an integrated circuit in the interconnect module, wherein the integrated circuit has a second surface facing the first surface; and
    communicating the electrical signals to and from the electrical connector to a backplane, wherein the interconnect module is coupled to the backplane in conjunction with zero or more additional instances of the interconnect module in a stacked configuration.

* * * * *